Patented Sept. 23, 1941

2,256,805

UNITED STATES PATENT OFFICE 2,256,805

VAT DYE COMPOSITION

Jean G. Kern, East Aurora, N. Y., assignor to National Aniline & Chemical Company, Inc., New York, N. Y., a corporation of New York No Drawing. Application November 28, 1938, Serial No. 242,741

9 Claims. (Cl. 8—70)

This invention relates to vat dye compositions, specifically to vat dye compositions in the form of vat dyestuff pastes and vat dye printing pastes. More particularly, the invention relates to pastes containing a vat dyestuff in the unreduced form.

In the usual method of printing with vat dyes, there is applied to the material to be printed a printing paste comprising a vat dye (which is ordinarily in the unreduced form but in some cases may be partly reduced); a reducing agent, such as sodium formaldehyde sulfoxylate; an alkaline material, such as potassium carbonate; a thickening agent, such as British gum; and water. Vat dye printing pastes also usually contain dispersing agents, water-substitutes, printing assistants, and/or other suitable additions. In the preparation of such printing pastes, vat dyestuff pastes, which may contain only a finely divided vat dye and water, but more often contain dispersing agents and/or solvents which have the function of preventing the drying out of the paste and/or printing assistants, etc., are usually employed. To make a vat dye printing paste using a vat dyestuff paste, the latter is mixed with a thickener composition containing the thickening agent, the alkaline material, and the reducing agent.

To color a material by the printing process with a vat dye printing paste, selected areas of the material are brought into contact with the roll of a printing machine containing the printing paste whereby those areas of the material are impregnated with the paste. The material is then subjected to a steaming operation whereby the vat dye is reduced by the reducing agent to the leuco form which is relatively soluble in the alkaline mixture. Since leuco vat dyes have strong affinity for materials composed of or containing cellulosic fibers, natural silk fibers, and artificial silk fibers or filaments, or mixtures of these, in the steaming operation the leuco vat dyes are taken up by the material to which the printing paste has been applied and, on allowing the prints to oxidize, vat dye prints are obtained.

The efficiency of the above process is dependent in large measure upon the extent to which reduction of the vat dye in the printing paste applied to the fabric is effected in the steaming operation. With the use of commercially available vat printing pastes, this reduction is often incomplete, which results in the production of specky prints. This disadvantage appears to be due to the fact that the unreduced vat dye is present in the printing paste in part in the form of large difficultly reducible particles or agglomerates rather than in uniform finely-divided dispersed condition throughout the paste. These particles or agglomerates are often formed because of the drying out of the vat dyestuff pastes employed in the preparation of the printing pastes. While attempts have been made to prevent this drying out of the vat dyestuff pastes, for example, by storing the pastes in cool and humid places, this difficulty has heretofore never been wholly overcome.

An object of the invention is to provide vat dye printing pastes in which the vat dye is substantially completely in the unreduced form and which on being used in the conventional printing process yield speck-free, brilliant prints.

Another object of the invention is to provide vat dye printing pastes which on being used in the usual manner insure substantially complete utilization of the vat dyes incorporated therein and effect excellent penetration of the dyes into the fiber.

Another object of the invention is to provide vat dyestuff pastes which efficiently retain their liquid constituents and are adapted for use in the preparation of vat dye printing pastes and dye baths in which the dyestuff is uniformly dispersed.

A further object of the invention is to provide readily dispersible vat dye powders which can be used in the production of valuable vat dye printing pastes and dye baths.

Other objects of the invention will in part be obvious and will in part appear hereinafter.

The vat dye compositions of the present invention contain as assistants in printing and dyeing process and/or as aids for improving the properties of vat dye compositions, particularly vat dye compositions in the form of pastes, one or more hydroxylated polyamino alkyl ethers or thioethers. These ethers and thioethers are compounds which contain a plurality of amino groups and at least one hydroxyl group. The central radical of these compounds is a radical containing two or more alkyl radicals linked together by oxygen or sulfur. The amino groups of these compounds may be unsubstituted or may contain alkyl radicals or aralkyl radicals as substituents. As employed in this specification and claims, the term "alkyl radicals" denotes and includes chain and cyclic alkyl radicals. The hydroxyl group or groups of the compounds may be in the central radical thereof or may be in an N-alkyl radical or radicals. Where the central aliphatic radical is free from hydroxyl groups, at least one and preferably two or more of the substituents of the amino groups are hydroxyalkyl radicals.

Thus the hydroxylated polyamino alkyl ethers and thioethers which can be used in the vat dye compositions of the present invention may be represented by the general formula:

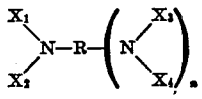

wherein R represents a radical consisting of alkyl radicals joined together by oxygen or sulfur (which alkyl radicals may be open chain or cyclic alkyl radicals and which may be unsubstituted or may contain substituents which do not alter the essential characteristics of the compounds such as, for example, hydroxyl, alkoxy, and aralkyloxy groups, etc.); $X_1$, $X_2$, $X_3$, and $X_4$ each represents hydrogen, an alkyl radical, an aralkyl radical, or a hydroxyalkyl radical; and $n$ represents a small whole number. In cases where the radical represented by R is free from hydroxyl groups, at least one of $X_1$, $X_2$, $X_3$, and $X_4$ represents a hydroxyalkyl radical. It is preferred to employ compounds in which the amino groups are substituted by at least one, and preferably two or more, hydroxyalkyl radicals, regardless of whether the radical represented by R contains hydroxyl groups.

It will be understood that the substituents of the amino groups of these compounds may themselves contain, in addition to hydroxyl groups, substituents which do not deleteriously affect the properties of the compounds; for example, they may contain substituted or unsubstituted alkoxy groups as substituents. In this connection it should be noted that where an N-aralkyl radical contains two or more carbon atoms in the alkyl radical thereof, and this alkyl radical contains hydroxyl groups as substituents, it is regarded as a hydroxyalkyl radical for the purposes of this invention.

In particular instances one or another of the compounds of the above class will be somewhat preferable for use to others of the class. In general, for economic and technical reasons, those which are ordinarily preferred for use in the vat dye compositions of the invention are hydroxylated polyamino alkyl ethers or alkyl thioethers in which the central radical contains two or more, especially two or three, ethylene groups. Further, the preferred compounds contain at least one, and preferably two or more, hydroxyethyl radicals as substituents in the amino groups.

The above-described hydroxylated polyamino alkyl ethers and thioethers are of low volatility and are easily soluble in water, alcohol, and in most organic solvents. The compounds which have low molecular weights have low melting points and are viscous liquids at ordinary temperatures; the viscosity of the compounds increasing with increase of their molecular weight. The compounds which have high molecular weights on the other hand are crystalline or amorphous solids which melt above 50° C. The hydroxylated polyamino alkyl ethers and thioethers, despite the presence therein of the oxygen and/or sulfur atoms, are strongly alkaline.

As examples of typical hydroxylated polyamino alkyl ethers and thioethers which are adapted for use in the vat dye compositions of the present invention, the following may be mentioned:

di-(2'-ethanol-2-amino-ethyl-) ether

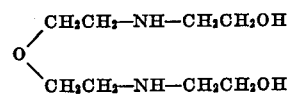

di-(2',3'-propandiol-2-amino-ethyl-) ether

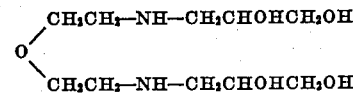

di-(gluco-2-amino-ethyl-) ether

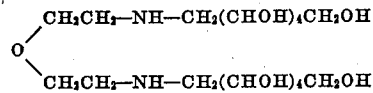

di-(N-methyl-N-gluco-2-amino-ethyl-) ether

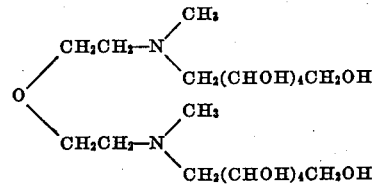

di-(N-amyl-N-gluco-2-amino-ethyl-) ether

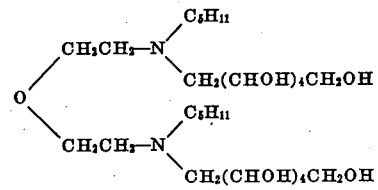

bis-(di-N-2'-ethanol-2-amino-ethyl-) ether

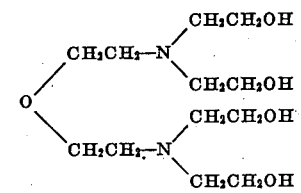

bis-(di-2',3-propandiol-2-amino-ethyl-) ether

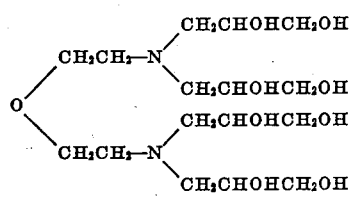

di-(N-n-butyl-2',3'-propandiol-2-amino-ethyl-) ether

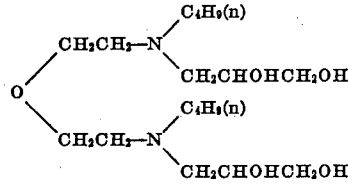

di-(ethanolamino-ethyl-) sulfide

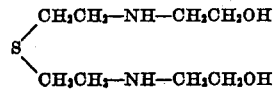

bis-(di-2'-ethanol-2-amino-ethyl-)sulfide

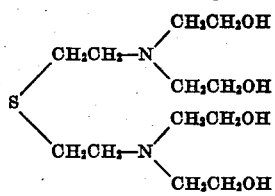

di-(2',3'-propandiol-2-amino-ethyl-)sulfide

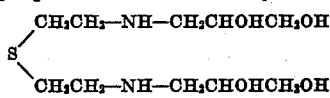

N-bis-(diethanol-amino-ethoxy-ethyl-)ethanolamine

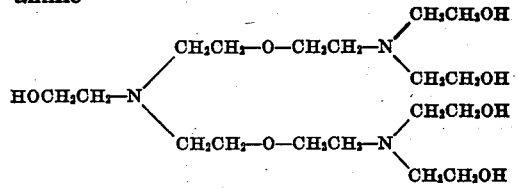

di-(N-4'-cyclohexanol-2-amino-ethyl-)ether

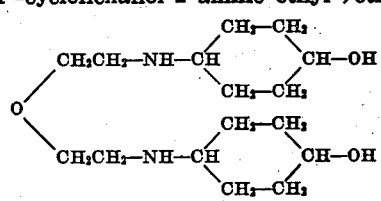

It has been discovered in accordance with the invention that the above described hydroxylated polyamino alkyl ethers and thioethers possess a combination of properties which make them valuable assistants for use in vat dye compositions, particularly vat dye compositions in the form of pastes. Thus, it has been found that if one or more of the hydroxylated polyamino alkyl ethers and thioethers are mixed with an aqueous paste of a vat dye containing only the dye and water or, in addition to these materials, a dispersing agent or other assistant, a valuable vat dyestuff paste is obtained which may be employed in dyeing, but is particularly adapted for use in the preparation of printing pastes or padding baths. The vat dyestuff paste can be dried to form a vat dye powder which is also particularly adapted for use in the making up of printing pastes or padding baths. The hydroxylated polyamino alkyl ethers and thioethers may also be incorporated with the other ingredients making up a vat dye printing paste at the time such paste is prepared. The invention includes the vat dyestuff pastes and powders, the printing pastes, and other vat dye compositions containing one or more of the hydroxylated polyamino alkyl ethers and thioethers. The invention also includes processes of printing employing the vat dye printing pastes of the invention.

In accordance with one manner of proceeding, the vat dye pastes of the present invention can be prepared by mixing with the aqueous press cake of the vat dyestuff obtained in the course of its manufacture one or more of the hydroxylated polyamino alkyl ethers or thioethers in liquid or molten form or in solution in appropriate solvents. It is generally desirable, however, to include in the vat dyestuff pastes, in addition to the press cake and the hydroxylated polyamino alkyl ether or thioether, a dispersing agent such as, for example, the sulfonic acids of benzene, hydroxybenzene, naphthalene, and aldehyde condensation products thereof (e. g., Leukanol which is said to be a condensation product of formaldehyde and a sulfonation derivative of naphthalene, or a sulfonated condensation product of formaldehyde and naphthalene), alkyl-aryl sulfonates, higher alkyl sulfates or sulfonates, and the like, and/or a water substitute, such as glycerine, ethylene glycol, diethylene glycol, or triethylene glycol, etc. An advantageous manner of preparing vat dyestuff pastes of the present invention is to incorporate one or more of the hydroxylated polyamino alkyl ethers or thioethers with a vat dyestuff paste which already contains the aforesaid additional materials. As already indicated, the vat dye powders of the invention may be prepared in a simple manner by drying the vat dyestuff pastes.

The vat dye printing pastes of the present invention may be conveniently prepared by either of two methods. In accordance with one method they are prepared by merely mixing a vat dyestuff paste of the type described above containing one or more of the hydroxylated polyamino alkyl ethers or thioethers with the ordinary materials (i. e., a thickener, an alkaline material, and a reducing agent such as sodium formaldehyde sulfoxylate) which are usually added to vat dyestuff pastes to make up vat dye printing pastes. The vat dye printing pastes may also be prepared by mixing one or more of the hydroxylated polyamino alkyl ethers or thioethers with the said ingredients which are usually added to a vat dyestuff paste to prepare therefrom the corresponding vat dye printing pastes. In this case it is preferable to employ as a starting material a conventional vat dyestuff paste which contains a dispersing agent and/or a water substitute and/or other suitable additions in combination with the aqueous press cake of the vat dyestuff. The vat dye printing pastes may also be prepared in accordance with this general method by starting with an aqueous press cake of a vat dye and incorporating with the press cake the usual materials present in a printing paste except that there is also included in place of part of the alkaline material and/or the dispersing agent and/or the water substitute a desirable proportion of one or more of the hydroxylated polyamino alkyl ethers or thioethers.

It will be understood that the proportions of the assistants to be employed in the preparation of the pastes can be varied according to the character of dyestuff employed and the other ingredients included in the paste. If desired, the whole or any part of the liquid phase of one of the new vat dyestuff pastes of the present invention may consist of the hydroxylated polyamino alkyl ethers or thioethers herein described; and in the corresponding vat dye printing pastes the amount of ether or thioether may be as high as about 15 per cent by weight.

The presence of the hydroxylated polyamino alkyl ethers or thioethers in the new vat dyestuff compositions does not make it necessary to exclude from the compositions other additions and aids which are commonly employed in vat dyestuff compositions. Hence, the new vat dyestuff compositions may contain other ingredients such as catalysts, boosters, and textile assistants as, for example, heavy metal salts, alkylol monoamines, and printing assistants such as are disclosed in my United States Patent Nos. 2,067,926, 2,067,928, 2,074,150, and 2,145,193.

The new vat dyestuff pastes and the printing pastes made therewith vary in consistency and may be fluid to viscous liquids or semi-solids. They are of high tinctorial strength. The pastes retain their liquid constituents and do not harden or form dry crusts upon exposure to the atmosphere. Thus the vat dyestuff pastes of the invention are smooth and contain the dye in a finely-divided and well-dispersed form. Because the pastes do not dry out on standing, the formation of difficultly reducible agglomerates of vat dye particles is avoided. Hence, the vat dyestuff pastes may be easily and quickly incorporated in printing pastes to produce smooth pastes in which the vat dye is evenly dispersed.

Although the vat dyestuff pastes and powders may be used with advantage in the preparation of dye baths of various types for the coloring of textile materials, particularly dye baths such as those disclosed in my copending application Serial No. 242,743, filed of even date herewith, they are particularly valuable when employed in the preparation of the vat dye printing pastes of the present invention.

The vat dye printing pastes of the invention are exceptionally smooth in character. The printing pastes have valuable properties due to the fact that the hydroxylated polyamino alkyl ethers and thioethers have pronounced binding powers. These assistants when used in vat dye printing pastes induce greater solubility of the leuco forms of the vat dyes in the pastes and thereby cause better penetration and fixation of the dyes. This property of the assistants is evidenced by the facts that the fastness to rubbing of the printed goods is increased and the brilliancy of the shades of the prints is enhanced. Further, in using the printing pastes of the present invention, the ground shade or white ground of the printed material is left substantially clean.

It has further been found that by employing the above hydroxylated polyamino alkyl ethers or thioethers in vat dyestuff pastes and vat dye printing pastes containing vat dyes with which satisfactory results are ordinarily not obtained, such pastes are productive of entirely satisfactory dyeings and prints. For example, vat dye pastes containing the new assistants and an anthraquinone vat dye yield uniform results under varying ageing conditions, results ordinarily not obtainable with commercial anthraquinone vat dye pastes. Furthermore, the shades imparted by mixtures of certain vat dyes which usually produce uneven shades are more uniform when used in printing pastes containing the new assistants of the present invention. A particular result which may be obtained is the achievement of intense and fast vat blacks, ordinarily difficult of achievement, by employing the new assistants in vat dyestuff pastes or printing pastes containing the desired dyes. Also, with the compositions made according to the present invention it is possible to obtain the full value of halogenated indanthrene printing colors.

The following examples will serve to illustrate the invention. The parts are by weight:

EXAMPLE 1—*Part 1.*—A standard thickener is prepared as follows:

| | Parts |
|---|---|
| Corn starch | 100 |
| British gum | 300 |
| Gum tragacanth 5% | 100 |
| Water | 500 |
| | 1000 |

These are well mixed together and boiled thoroughly to a smooth paste.

To 520 parts of the above standard thickening paste, 170 parts of potassium carbonate and about 60 parts of water are added, and heat is applied to boil until the whole forms a homogeneous paste which is then left to cool to 70° C., after which 140 parts of sodium formaldehyde sulfoxylate, 50 parts of glycerine, and 60 parts of water are added.

A blue vat dye printing paste is made up by adding 200 parts of Carbanthrene Blue GCD double paste (C. I. No. 1113), which contains 16½ per cent of dye solids and 1 per cent of Leukanol, to 675 parts of the above thickening after which 125 parts of di-(2'-ethanol-2-amino-ethyl-) ether are added and these ingredients are mixed until the printing paste is quite smooth.

*Part 2.*—Cotton or rayon cloth is printed with this vat dye printing paste by means of a rotary intaglio printing machine. Thereafter, the material is dried and aged for five minutes in air-free saturated steam at 100° C. and is then rinsed in cold water, soaped at the boil, rinsed, and dried. The cloth thus treated contains thereon in selected areas prints of a dark shade of blue of better brilliancy and depth than prints obtained under similar conditions with a printing paste from which the above assistant has been omitted.

Weaker shades of this blue may be obtained by diluting the blue vat dye printing paste with a paste which is designed for such dilutions and which contains, for example, 600 parts of the foregoing standard thickener and 230 parts of water in which 80 parts of potassium carbonate, 60 parts of sodium formaldehyde sulfoxylate, and 30 parts of glycerine have been dissolved.

Instead of employing Carbanthrene Blue GCD double paste in the foregoing example, improved results also may be obtained with the use of an equal amount of the vat dye powder prepared according to Example 9 of my United States Patent 2,067,926 comprising in dry solid form a mixture of the above dyestuff, Leukanol, isobutyl sodium sulfate, and urea.

Printing pastes producing prints of a similar quality may be obtained by using other vat dyes in place of Carbanthrene Blue GCD of the above example. In particular, vat dyes of the anthraquinone type; for example those dyes known as indanthrene vat dyes, and dyes of the halogenated violanthrone, and benzanthrone series may be used in this connection. As examples of such dyes may be mentioned the following:

| | Color Index No. |
|---|---|
| Carbanthrene Yellow G double powder | 1118 |
| Carbanthrene Golden Orange 2RT powder | 1097 |
| Carbanthrene Golden Orange G double powder | 1096 |
| Carbanthrene Blue Green FFB double powder | 1173 |
| Carbanthrene Violet 2R powder | 1104 |
| Carbanthrene Dark Blue DR | 1099 |
| Carbanthrene Flavine GC double powder | 1095 |
| Carbanthrene Red Violet 2RNX powder | 1161 |
| Carbanthrene Brilliant Green supra | 1101 |

There may also be employed the bases for vat blacks derived from benzanthrone which has been nitrated, chlorinated, and/or reduced, and mixtures of these dyes which are made to produce all intermediate shades; for example, browns, navy blues, blacks, etc.

In the preparation of a vat dye printing paste in accordance with the procedure of the above example, the dye is preferably employed in the form of a dispersed vat dye paste or powder which contains dispersing agents and/or other assistants.

The following example illustrates a method for the preparation and use of a vat dye printing paste in accordance with the present invention in which a dyestuff of the indigoid series is employed.

EXAMPLE 2—*Part 1.*—520 parts of the standard thickener described in Example 1 are mixed with 150 parts of potassium carbonate and 100 parts of water, and heat is applied to the mixture until it is a smooth paste. Thereafter, the paste is cooled down to about 70° C., whereupon 120 parts of sodium formaldehyde sulfoxylate, 50 parts of glycerine, and 60 parts of water are added. A vat dye printing paste for orange prints is then made up as follows: 200 parts of National Vat Orange R printing paste (C. I. No. 1217), which contains 12½ per cent thioindigo dyestuff and 87½ per cent liquid phase free from hydroxylated polyamino alkyl ethers or thioethers, are mixed intimately into 740 parts of the above thickener, and 60 parts of di-(gluco-2-amino-ethyl-) ether are then added.

*Part 2.*—Rayon materials are printed with the printing paste of Part 1 of this example by the usual methods; the prints being dried and passed for four minutes through an air-free ager, then through an aqueous oxidizing bath maintained at 140° C. and containing ¼ per cent of sodium bichromate and ½ per cent of acetic acid. The materials are then rinsed, soaped at the boil, rinsed, and dried. The resulting print is well penetrated with a brilliant shade which has greater depth than that of a similar print obtained from a vat dye printing paste from which the di-(gluco-2-amino-ethyl-) ether has been omitted.

In a similar manner, weaker shades may be obtained by diluting the orange vat dye printing paste of this example with a diluting paste which is prepared, for example, from 600 parts of the standard thickener described in Example 1, 70 parts of potassium carbonate, 40 parts of sodium formaldehyde sulfoxylate, and 30 parts of glycerine, dissolved in 260 parts of water.

Vat dye printing pastes may be prepared in a manner similar to that described in Example 2 by using in place of the orange vat dyestuff of the example other vat dyes, and particularly vat dyes of the indigoid and thioindigoid series, such as, for example:

| | Color Index No. |
|---|---|
| Brilliant Indigo 4G powder | 1189 |
| Brilliant Indigo 4B powder (tetrabrom indigo) | |
| Vat Scarlet G paste | 1228 |
| Vat Brown G paste (di-naphthylthioindigo) | |
| Vat Violet R paste | 1222 |
| Vat Green G paste | 1199 |

Vat dye printing pastes of valuable properties may be prepared in an analogous manner by replacing the hydroxylated polyamino alkyl ethers used in the above examples by other hydroxylated polyamino alkyl ethers or thioethers of the class above disclosed; for example, one or a mixture of those specifically mentioned. It is to be understood that the various proportions set forth in the foregoing examples may be varied widely depending upon the material and dye employed and the shade desired. However, where a standardized vat dyestuff paste of the usual type is used in the preparation of a completed printing paste the amount of assistant ordinarily should not be reduced below about 5 per cent based on the weight of the standardized vat dyestuff paste. In cases where a printing paste contains about 20 per cent of a standardized vat dyestuff paste, the amount of assistant preferably should be adjusted at about 5 per cent to 13 per cent of the weight of the printing paste.

As already pointed out, vat dyestuff pastes and vat dye printing compositions may be prepared in accordance with the present invention by incorporating one or a mixture of the hydroxylated polyamino alkyl ethers or thioethers which are employed as assistants in the present invention with an aqueous press cake of a vat dye which may or may not be combined with dispersing agents, water substitutes, and/or other suitable additions. The following examples are illustrative of particular methods of practicing the invention in accordance with this manner of procedure. The examples refer to the utilization of the vat dyestuff pastes in the manufacture of vat dye printing pastes. It is to be understood, however, that the vat dyestuff pastes, while of particular value in the manufacture of vat dye printing pastes, may also be employed in the preparation of vat dye baths of various types.

EXAMPLE 3.—The dyestuff paste as produced in the course of manufacture of Carbanthrene Blue GCD (C. I. No. 1113) is converted into a press cake containing about 70 per cent water and about 30 per cent solids as dry vat dye. 400 parts by weight of the press cake are then intimately mixed with 600 parts of an aqueous paste of the new assistant obtained by adding 100 parts of water to 500 parts of di-(N-amyl-N-gluco-2-amino-ethyl-) ether until a smooth homogeneous paste is obtained.

200 parts of the Carbanthrene Blue GCD paste thus prepared may be used in place of the 200 parts of Carbanthrene Blue GCD double paste in Example 1, and produces prints similar to those obtained in that example. Also, the paste of this example may be used in the preparation of a printing paste by mixing it with the usual ingredients employed in making up such pastes, without adding an ether or thioether.

The quantities of the materials employed in the preparation of vat dye pastes in accordance with the above example may be varied considerably without losing the advantages of the present invention. Thus, a paste made by mixing 400 parts of a press cake which contains 30 per cent solids as vat dye and a solution of 400 parts of di-(N-amyl-N-gluco-2-amino-ethyl-) ether and 200 parts of water is superior to the commercial aqueous pastes of vat dyes now available, but is not quite as efficient as a paste prepared in accordance with the above Example 3.

EXAMPLE 4.—1000 parts of Carbanthrene Blue GCD aqueous paste containing 17½ per cent total dye solids and 1½ per cent Leukanol are mixed with 500 parts bis-(di-N-2'-ethanol-2-amino-ethyl-)ether into a homogenous paste which is then evaporated until its weight is reduced to 1000 parts. A very smooth vat dye paste is thus obtained which shows the same improved characteristics as the paste obtained in the previous Example 3.

The bis-(di-N-2'-ethanol-2-amino-ethyl-) ether used in this example can be replaced by the corresponding bis-(di-N-2'-ethanol-2-amino-ethyl-)thioether.

EXAMPLE 5.—500 parts of a press cake of Carbanthrene Violet 2R (C. I. No. 1104) containing 80 per cent water and 20 per cent dry dye are mixed with 1 per cent of a dispersing agent (Leukanol 30 per cent solution) and 490 parts of di-(ethanol-aminoethyl-) sulfide. This vat dye paste may be made up into a printing paste which possesses remarkable printing qualities inasmuch as it surpasses, in printing strength and penetrating qualities, conventional commercial printing pastes.

EXAMPLE 6.—To 1000 parts of an aqueous paste of Carbanthrene Dark Blue DR paste (C. I. No. 1099) containing 15 per cent dry dye solids and 1½ per cent Leukanol (total solids 16½ per cent) are added 450 parts of glycerine and 300 parts of di-(N-methyl-N-gluco-2-amino-ethyl-) ether, and the mixture is evaporated until its weight is 1000 parts (i. e., the water evaporated amounts to 750 parts). The resulting paste is then screened and, after cooling, is ready for use. It is a valuable vat dyestuff paste adapted for use in the production of dark blue prints of excellent strength and brilliance.

In this example, the glycerine may be replaced entirely by its equivalent weight of water, or by its equivalent weight of water and one or a mixture of the hydroxylated polyamino alkyl ethers and thioethers herein disclosed, or by its equivalent weight of ethylene glycol, diethylene glycol, or triethylene glycol, or mixtures of these.

Vat dye pastes of similar properties may be prepared by using other vat dyestuffs, and others of the class of hydroxylated polyamino alkyl ethers and thioethers above described; for example, the dyes and ethers and thioethers hereinbefore specifically disclosed, in place of the vat dyestuffs and hydroxylated polyamino alkyl ethers and thioethers incorporated in the vat dyestuff pastes illustrated in Examples 3 to 6. While, as has already been indicated, the quantity of the hydroxylated polyamino alkyl ether and/or thioether to be used in the preparation of the vat dyestuff pastes cannot be exactly fixed because it is dependent upon a number of variable factors, to get best results with respect to stability and dyeings in heavy as well as weak shades, it has been found, in general, that the quantity of the assistant should not be reduced below 30 per cent of the total weight of the final vat dyestuff paste. As noted above, the assistant may constitute the entire liquid phase of the pastes.

As appears from the above description, the vat dye compositions preferably comprise the vat dye in the unreduced form. However, vat dye compositions in which the vat dye is in the free leuco form or in the form of a soluble metal salt thereof are also included in the invention.

Since numerous changes may be made in the compositions and processes above described without departing from the scope of the invention, the above description is to be interpreted as illustrative and not in a limiting sense.

I claim:

1. A vat dye composition comprising a vat dye and an organic amino compound of the following general formula:

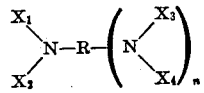

wherein R represents a radical consisting of lower alkyl groups joined together by a member selected from the group consisting of oxygen and sulfur; $X_1$, $X_2$, $X_3$, and $X_4$ each represents a member selected from the group consisting of hydrogen, alkyl radicals, aralkyl radicals, and hydroxyalkyl radicals, at least one of the substituents represented by $X_1$, $X_2$, $X_3$, and $X_4$ being a hydroxyalkyl radical when the radical represented by R is free from hydroxyl groups; and $n$ represents a whole number not greater than 2.

2. A vat dye composition comprising a vat dye and a hydroxylated aliphatic diamine in which the central radical consists of lower alkyl radicals joined together by a member selected from the group consisting of oxygen and sulfur, and containing as N-substituent at least one hydroxyalkyl radical, said diamine being free from N-substituents other than alkyl radicals, aralkyl radicals and their hydroxy derivatives.

3. A vat dye composition for direct application to textile fibers comprising an unreduced vat dye, a thickener, water, and a hydroxylated aliphatic diamine in which the central radical consists of lower alkyl radicals joined together by a member selected from the group consisting of oxygen and sulfur and containing as N-substituent at least one hydroxyalkyl radical, said diamine being free from N-substituents other than alkyl radicals, aralkyl radicals and their hydroxy derivatives.

4. A vat dyestuff paste comprising an unreduced vat dye, a dispersing agent, and a hydroxylated polyamino alkyl ether in which the central radical consists of lower alkyl radicals joined together by oxygen and containing as N-substituent at least one hydroxyalkyl radical, said diamine being free from N-substituents other than alkyl radicals, aralkyl radicals and their hydroxy derivatives.

5. A vat dye printing paste comprising an unreduced vat dye, a thickener, water, a reducing agent, and a hydroxylated aliphatic diamine in which the central radical consists of lower alkyl radicals joined together by a member selected from the group consisting of oxygen and sulfur and containing as N-substituent at least one hydroxyalkyl radical, said diamine being free from N-substituents other than alkyl radicals, aralkyl radicals, and their hydroxy derivatives.

6. A process of coloring textile fibers by the printing method which comprises applying to said fibers a vat dye printing paste comprising an unreduced vat dye, a reducing agent, a thickener, water, and an organic amino compound of the following general formula:

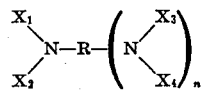

wherein R represents a radical consisting of lower alkyl groups joined together by a member selected from the group consisting of oxygen and sulfur; $X_1$, $X_2$, $X_3$, and $X_4$ each represents a member selected from the group consisting of hydrogen, alkyl radicals, aralkyl radicals, and hydroxyalkyl radicals, at least one of the substituents represented by $X_1$, $X_2$, $X_3$, and $X_4$ being a hydroxyalkyl radical when the radical represented by R is free from hydroxyl groups; and $n$ represents a whole number not greater than 2.

7. A vat dye composition comprising a vat dye and di-(2'-ethanol-2-amino-ethyl-) ether.

8. A vat dye composition comprising a vat dye and di-(N-methyl-N-gluco-2-amino-ethyl-) ether.

9. A vat dye composition comprising a vat dye and di-(ethanol-aminoethyl-) sulfide.

JEAN G. KERN.